(12) United States Patent
Hendrickson et al.

(10) Patent No.: US 12,538,918 B2
(45) Date of Patent: Feb. 3, 2026

(54) WILD GAME CALLING DEVICE

(71) Applicant: BRO LLC, Roseburg, OR (US)

(72) Inventors: Jim Hendrickson, Warren, OR (US);
Eric Strand, Roseburg, OR (US);
Trent Fisher, Roseburg, OR (US);
Kody Kellom, Roseburg, OR (US);
Treavor Fisher, Roseburg, OR (US)

(73) Assignee: BRO LLC, Roseburg, OR (US)

( * ) Notice: Subject to any disclaimer, the term of this patent is extended or adjusted under 35 U.S.C. 154(b) by 72 days.

(21) Appl. No.: 18/451,970

(22) Filed: Aug. 18, 2023

(65) Prior Publication Data

US 2024/0065260 A1 Feb. 29, 2024

Related U.S. Application Data

(63) Continuation-in-part of application No. 17/821,900, filed on Aug. 24, 2022, now Pat. No. 12,185,716.

(51) Int. Cl.
*A63H 5/00* (2006.01)
*A01M 31/00* (2006.01)
*G10K 9/02* (2006.01)

(52) U.S. Cl.
CPC .............. *A01M 31/004* (2013.01); *A63H 5/00* (2013.01); *G10K 9/02* (2013.01)

(58) Field of Classification Search
CPC ................................ A01M 31/004; A63H 5/00
See application file for complete search history.

(56) References Cited

U.S. PATENT DOCUMENTS

| | | | | |
|---|---|---|---|---|
| 3,991,513 | A * | 11/1976 | Faulk | A63H 5/00 446/208 |
| 4,637,154 | A * | 1/1987 | Laubach | A01M 31/06 446/202 |
| 4,761,149 | A * | 8/1988 | Laubach | A01M 31/004 446/208 |
| 4,850,425 | A * | 7/1989 | Anderson | B29B 13/022 264/40.6 |
| 4,850,925 | A * | 7/1989 | Ady | A01M 31/00 446/207 |
| 5,030,159 | A * | 7/1991 | Beer | G10K 5/00 446/207 |
| 5,061,220 | A * | 10/1991 | Cooper | A01M 31/004 446/397 |
| 5,234,369 | A * | 8/1993 | Forbes | B29C 66/73921 446/207 |
| 6,231,418 | B1 * | 5/2001 | Hancock | A01M 31/004 446/397 |
| 9,485,982 | B2 * | 11/2016 | Pribbanow | A01M 31/004 |
| 10,172,344 | B1 * | 1/2019 | Carlton | A01M 31/004 |
| 11,076,592 | B1 * | 8/2021 | Summerfield | G10K 11/04 |
| 2017/0181422 | A1 * | 6/2017 | Reagan | A01M 31/004 |

* cited by examiner

*Primary Examiner* — John A Ricci
(74) *Attorney, Agent, or Firm* — Berkeley Law & Technology Group, LLP

(57) ABSTRACT

Example methods, apparatuses, and/or articles of manufacture related to wild game calling are disclosed that may be implemented, in whole or in part, using a game calling device. In a particular implementation, a game calling device may closely imitate the call of an elk while air is passed over a reed to make a game call sound.

11 Claims, 15 Drawing Sheets

WILD GAME CALLING DEVICE

CROSS-REFERENCE TO RELATED APPLICATION (S)

This application is a continuation-in-part of, and claims under 35 U.S.C. § 120 priority to, U.S. patent application Ser. No. 17/821,900, entitled "WILD GAME CALLING DEVICE," filed Aug. 24, 2022, which names Jim Hendrickson, Eric Strand, Trent Fisher, Kody Kellom, and Treavor Fisher as inventor(s), which is assigned to the current assignee hereof, and which is incorporated herein by reference in its entirety for all purposes.

FIELD

The present disclosure relates to a wild game calling device and methods of its construction and use.
Information
Hunters have used game calling devices for calling or attracting the attention of wild animals, such as elk or other game, and in particular for imitating the calls of game, such as the vocalizations of elk as they communicate with one another in the wild. Still, there remains a need for improved wild game calling devices.

BRIEF DESCRIPTION OF THE DRAWINGS

The present disclosure may be better understood, and its numerous features and advantages made apparent to those skilled in the art by referencing the accompanying drawings. Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings.

Figure 1:
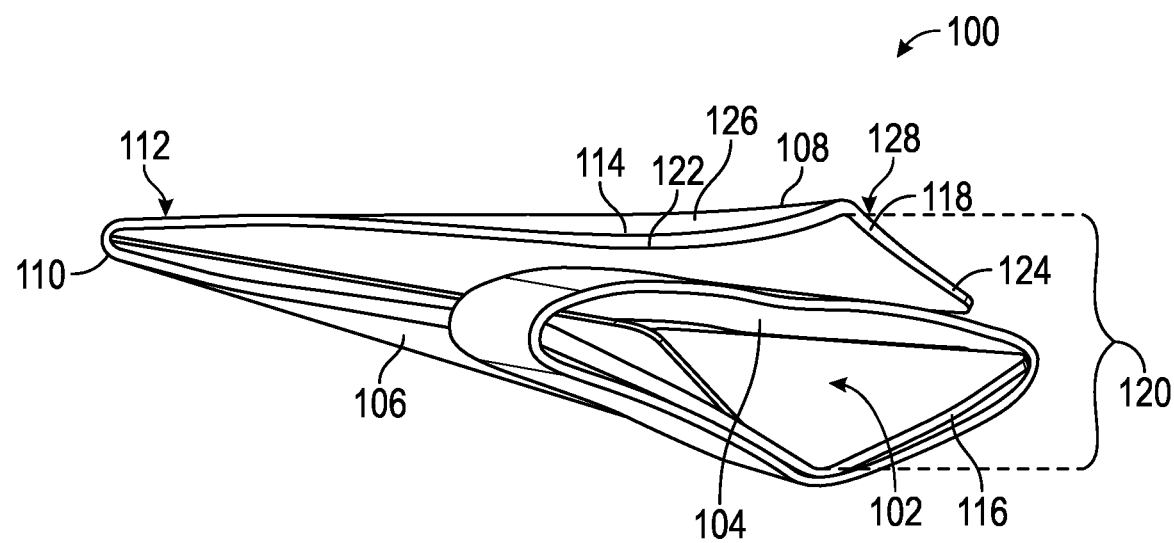
FIG. 1 is a perspective side view of a game calling device, according to an embodiment.
Figure 2:
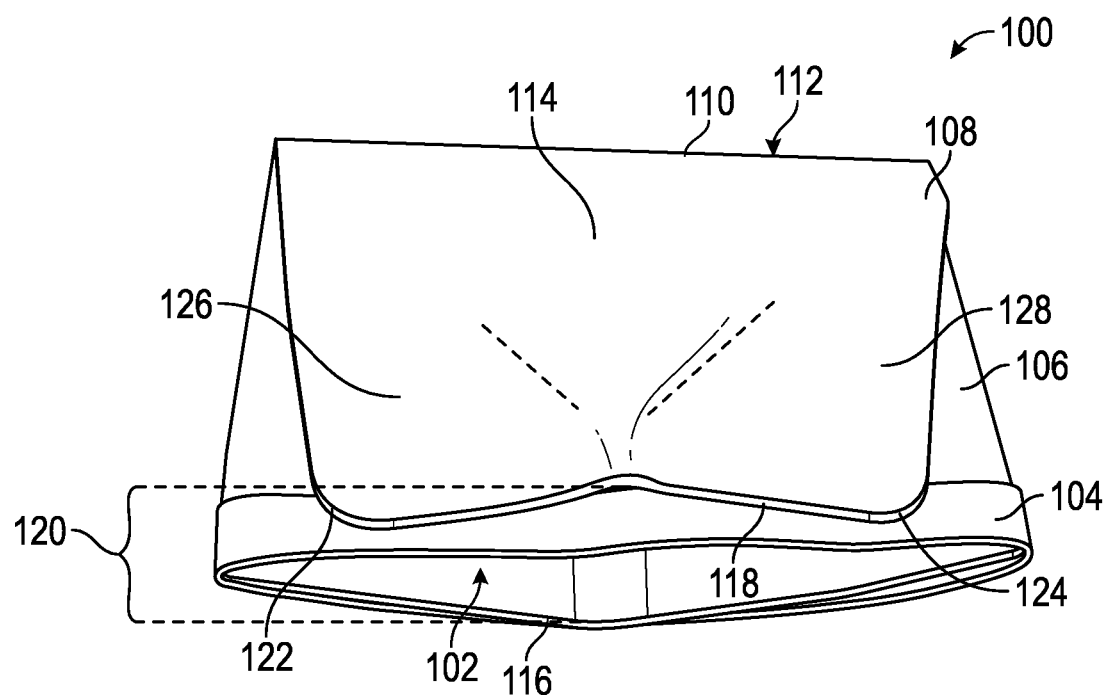
FIG. 2 is a perspective front view of a game calling device, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

Present embodiments provide wild game calling devices, wild game calling systems, methods of their manufacture, and methods of their use. Present embodiments provide various advantages and benefits related to ease of use over diaphragm game calls and other reeded game calls. Diaphragm calls may consist of single or multiple layered latex reeds disposed in a tapered "U"-shaped flexible frame that must be inserted into the user's mouth such that the top of the call's resonant chamber is located in the roof of the user's mouth. Insertion of the resonant chamber into the roof of the mouth may prevent adoption by many users due to discomfort (e.g., gag reflex) as well as sanitary concerns. Further, differences in sizes and shapes of users' mouths makes effective use of such calls challenging because the resonant chamber may only seal properly in a limited number of mouth positions and is often difficult for a single caller to produce sounds having a wide tonal variety. Thus, such diaphragm calls generally require the user to possess a relatively high level of skill to produce an effective game call. Other reeded game calls may include a reed in the form of a rubber band that fits around or through the frame of the call but is unfixed with respect to the resonant chamber. Such rubber bands may rely upon the natural tension of the band to stay in place. Depending on a particular configuration of a game call device, the bands may also hold the body of the game call device together. Because the reed is unfixed in relation to the resonant chamber, uncontrolled slippage may occur, which can cause an unexpected change in the sound of the call, and depending on the configuration, an unexpected and/or uncontrollable deformation of the call body, either of which generally may require a user to possess a relatively high level of skill to produce an effective game call.

Embodiments of the present disclosure overcome these problems, and others, providing numerous benefits, by providing a call that does not require a resonant chamber to be inserted into the roof of a user's mouth, and that produces an effective, wide tonal variety that can closely imitate the call of an elk by providing a cavity that is easily deformable while air is passed over a reed to make a game call sound; and a tension of the reed may vary responsive to a force applied by a user to the cavity to modulate a pitch of the game call sound. The force applied by the user is easily accomplished such as with fingers and/or lips. Moreover, the described embodiments, provide simple and inexpensive calling devices that may include non-latex, hypoallergenic materials, that have reeds that are substantially free of slippage with respect to a game call device body, and that can be carried in a pocket and operated easily by a hunter or user seeking game without having much experience in using the device.

FIGS. 1-5 show an embodiment of a game calling device 100. Game calling device 100 may comprise: a cavity 102; and a reed 104 disposed within the cavity, wherein: a cavity is deformable while air is passed over a reed to make a game call sound; and a tension of a reed may vary responsive to a force applied by a user to a cavity to modulate a pitch in a game call sound. In a particular implementation, cavity 102 may be formed between a first member 106 (also referred to herein as a "bottom" member) and a second member 108 (also referred to herein as a "top" member); wherein first member 106 and second member 108 are pressed toward each other responsive to a force. In an implementation, first member 106 and second member 108 may be coupled by a hinge 110 at a distal end 112 of a game calling device. In one aspect, first member 106, second member 108, and hinge 110 may comprise a folded structure 114 (also referred to herein as a "body" or "frame") defining a cavity 102. In some implementations, folded structure 114 may include a clam shell structure, or a combination thereof. In a demonstrative example, a proximal edge 116 of first member 106 and a proximal edge 118 of second member 108, at least in part, may form an air passage 120 (also referred to herein as a "mouthpiece") that is in communication with cavity 102. In a particular implementation, proximal edge 118 of second member 108 may comprise a first contact point 122, or a second contact point 124, or a combination thereof, that are adapted to contact and alter a tension of a reed 104 as first member 106 and/or second member 108 are pressed toward each other. In a demonstrative example, first contact point 122 or second contact point 124, or a combination thereof may comprise a first flap 126, or a second flap 128 of second member 108. In a specific implementation, first contact point 122 or second contact point 124 may comprise a tip of first flap 126 or second flap 128, respectively. In a demonstrative example, reed 104 may be "loose", meaning not in tension (i.e., not being stretched) while folded structure 114 is open (i.e., when a contact point or contact points 122, 124 are not in contact with reed 104).

Figure 3:
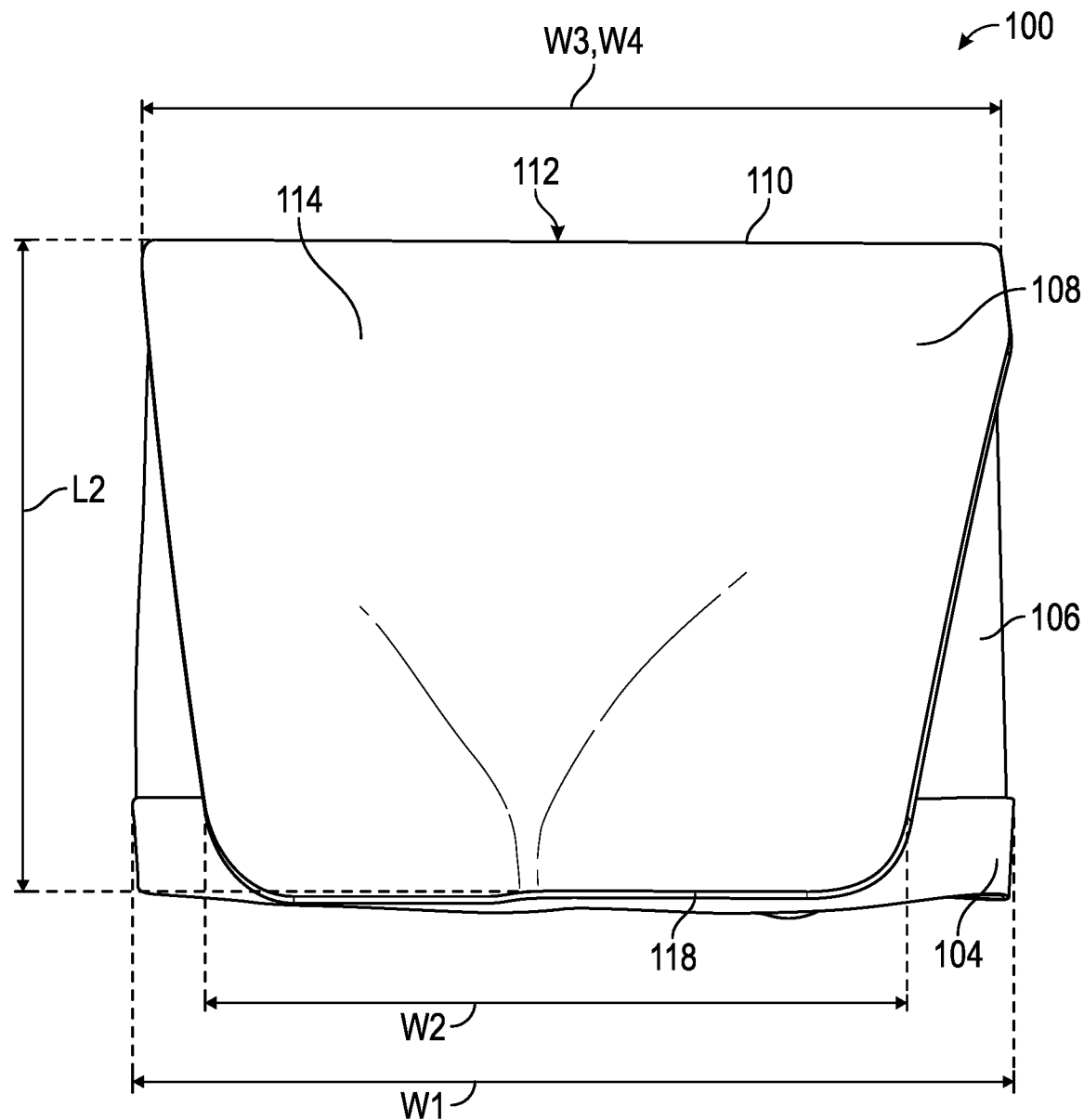
FIG. 3 is a top view of a game calling device, according to an embodiment.

Turning now to FIG. 3, which shows a top view of game calling device 100, the dimensions of a proximal edge (not visible) of first member 106 and proximal edge 118 of second member 108 may be different. In an embodiment, a proximal edge (not visible) of first member 106 may comprise a width ("W1") and proximal edge 118 of second member 108 may comprise a width ("W2"), wherein width "W2" is less than (i.e., is smaller or is narrower) than width "W1." In an embodiment, a ratio W2:W1 may comprise a value not greater than about 0.95 and not less than about 0.45. In a particular implementation, width W1 of first member 106 may vary. In demonstrative example, width W1 may comprise a value not greater than about 4.0 inches and not less than about 0.5 inches. In an embodiment, a width W2 may comprise a value of not greater than about 3.0 inches and not less than about 0.25 inches. In a particular implementation, second member 108 may comprise a length ("L2") that may vary. In a demonstrative example, length L2 may comprise a value of not greater than about 3.0 inches and not less than about 0.25 inches. In a particular implementation, distal edge of first member 106, distal edge of second member 108, and hinge 110 may comprise a continuous piece of material. In an aspect, hinge 110 may extend transversally along distal end 112 of folded structure 114. In a particular implementation, distal edge of a first member 106 may comprise a width ("W3"), and a distal edge of a second member 108 may comprise a width ("W4") that may be equal to each other and a width of a hinge.

Figure 4:
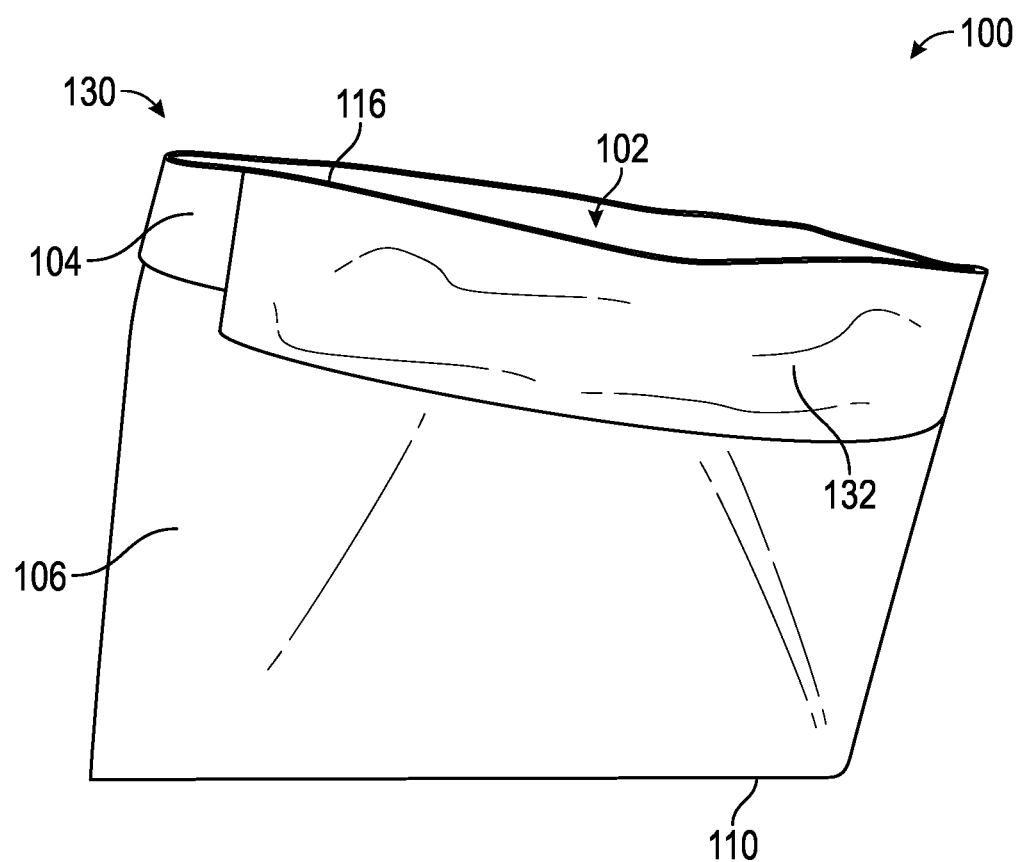
FIG. 4 is a perspective bottom view of a game calling device, according to an embodiment.

Turning now to FIG. 4, a perspective bottom view of game calling device 100 is shown. In an embodiment, reed 104 may be coupled to a proximal end 130 of first member 106 with a fastener 132. In particular implementations, reed 104 may comprises a band, a belt, a loop, or a strip of material. In a specific implementation, reed 104 may comprise an endless band of polymeric material. In specific implementation, fastener 132 may be an adhesive tape. In a demonstrative example, adhesive tape may be a gaffer's tape or a duct tape. In an aspect, reed 104 may be disposed parallel to proximal edge 116 of first member 106.

Figure 5:
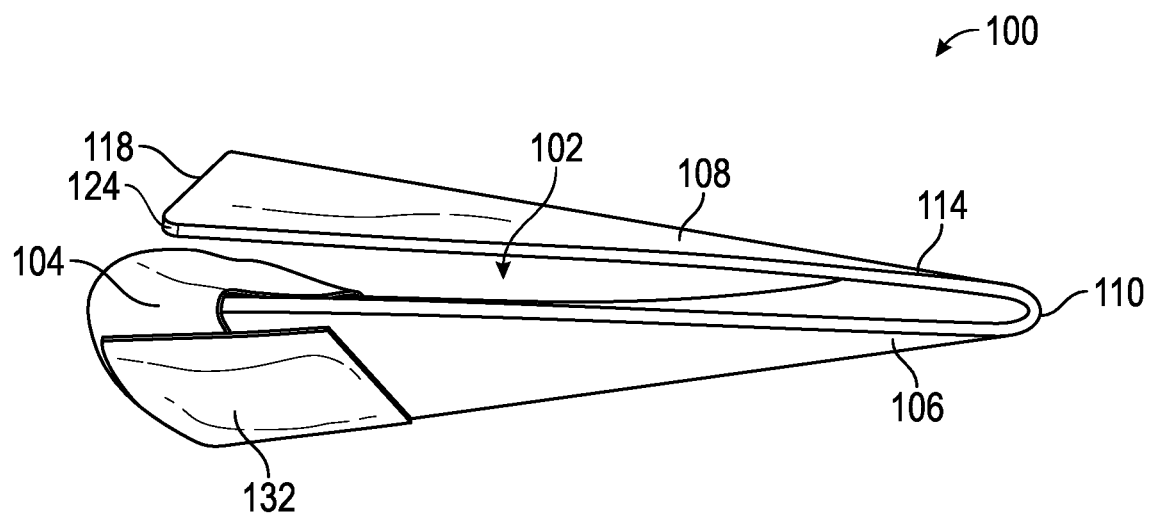
FIG. 5 is a right-side view of a game calling device, according to an embodiment.

Turning now to FIG. 5, a side view of game calling device 100 is shown. In an implementation, reed 104 is visible within cavity 102 defined by folded structure 114, which is comprised of first member 106, second member 108, and hinge 110 is clearly visible.

Figure 6:
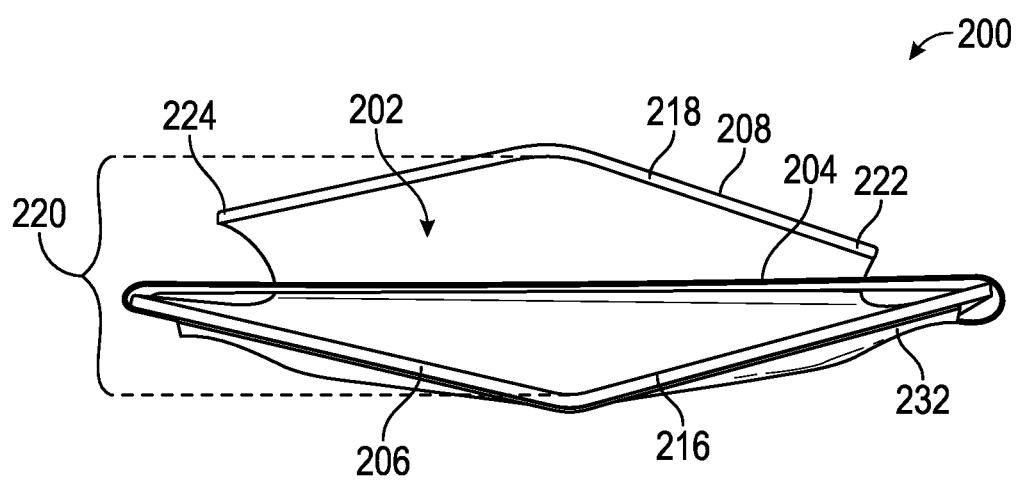
FIG. 6 is a front view of a game calling device, according to an embodiment.
Figure 7:
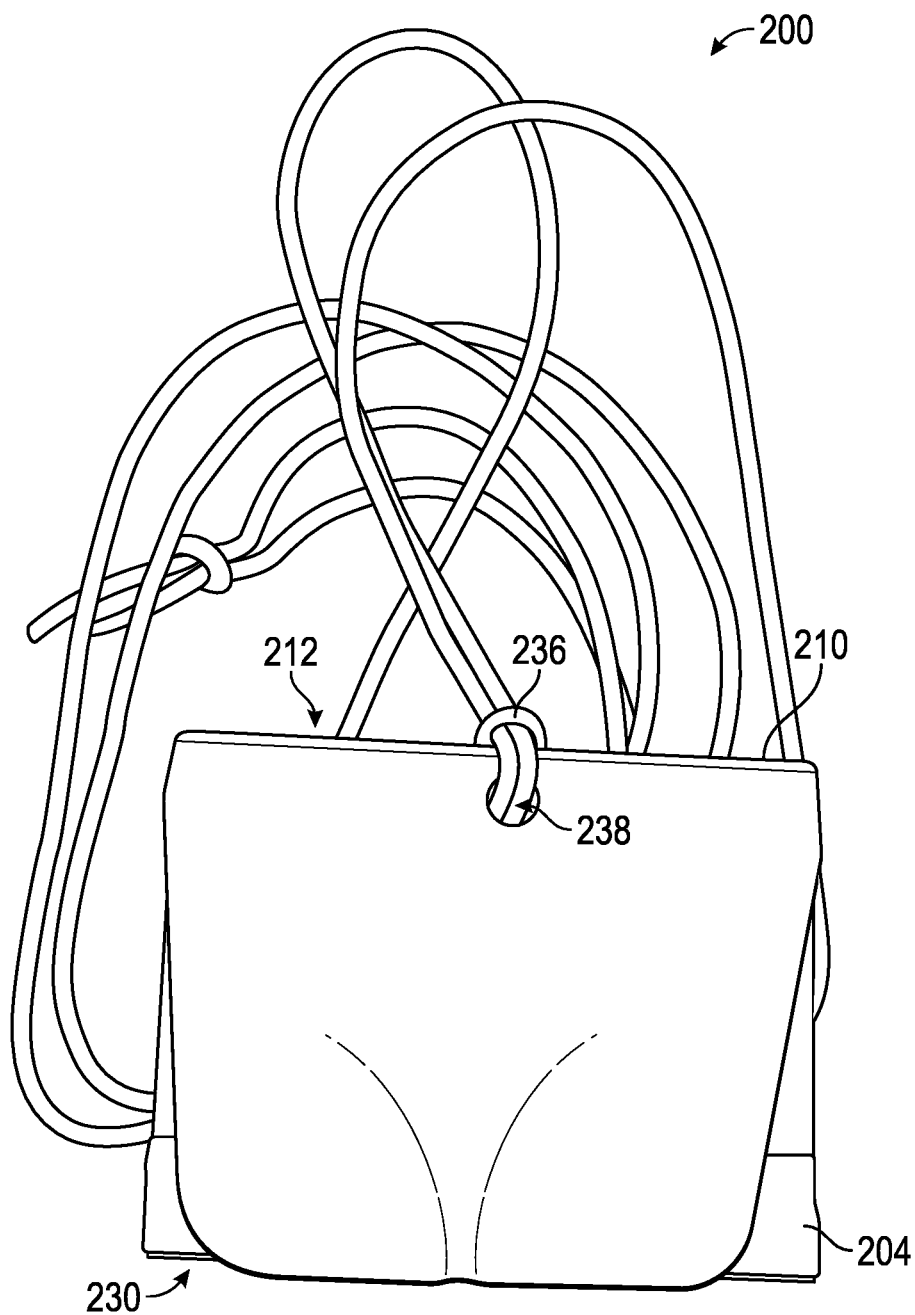
FIG. 7 is a top view of a game calling device, according to an embodiment.

FIGS. 6-7 show an embodiment of a game call device 200. As shown in FIG. 6, in an embodiment, game calling device 200 may include a body 214 (also called herein a "frame" or a "folded structure") comprised of a bottom member 206 (also referred to herein as a "first" member); a top member 208 (also referred to herein as a "second" member); and a hinge 210 (shown in FIG. 7); wherein body 214 defines an open interior space 202 (also referred to herein as a "cavity"). In an implementation, top member 206 and bottom member 208 may be joined together by hinge 210, which may extend transversally along a distal end 212 of body 214. In a particular implementation, proximal edge 216 of first member 206 and proximal edge 218 of second member 208 define a first air passage 220 (also referred to herein as a "mouthpiece") that is in communication with interior space 220. In an embodiment, reed 204 is disposed within first air passage 220 opposite hinge 210 and extends transversally across first air passage 220. In a particular implementation, reed 204 may be coupled to a proximal end 230 of first member 206. In an aspect, reed 204 may be disposed above (i.e., over), and extending parallel to, proximal edge 216 of first member 206. In a demonstrative example, a reed tensioner comprising a first contact point 222, or in combination with a second contact point 224, may be disposed on proximal edge 218 of second member 208 and may be adapted to alter a tension of reed 204 as first member 206 and second member 208 are pressed toward each other and contact points 222, 224 are in contact with reed 204. In a specific implementation, reed 204 may be "pre-tensioned", meaning that a reed is already in tension (i.e., is being stretched) while folded structure 214 is open (i.e., when contact points 222, 224 are not in contact with reed 204). As shown in FIG. 7, in a specific implementation, game calling device 200 may include a lanyard 236. In an example, lanyard 236 may be coupled to a body 214. In an embodiment, lanyard 236 may be disposed through an orifice 238 disposed in second member 208 and an orifice (not shown) disposed in first member 206.

Figure 8:
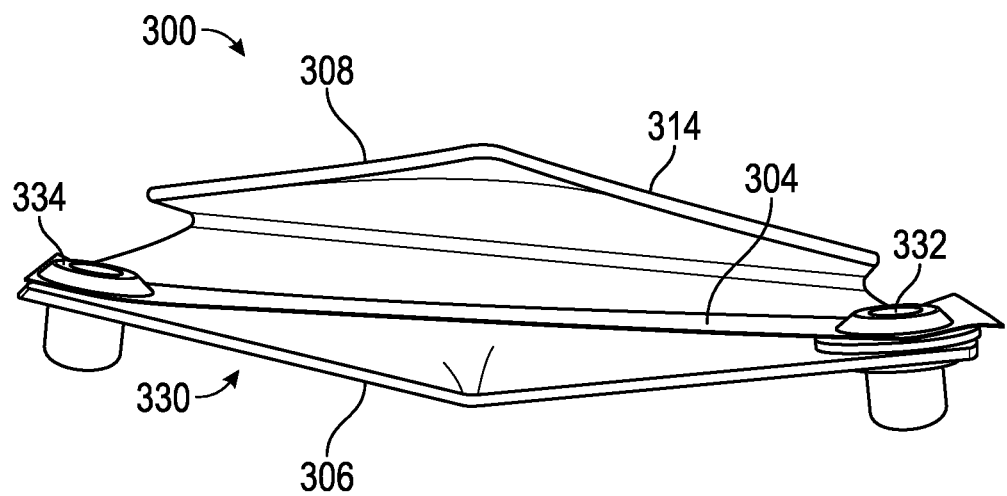
FIG. 8 is a front view of a game calling device, according to an embodiment.
Figure 9:
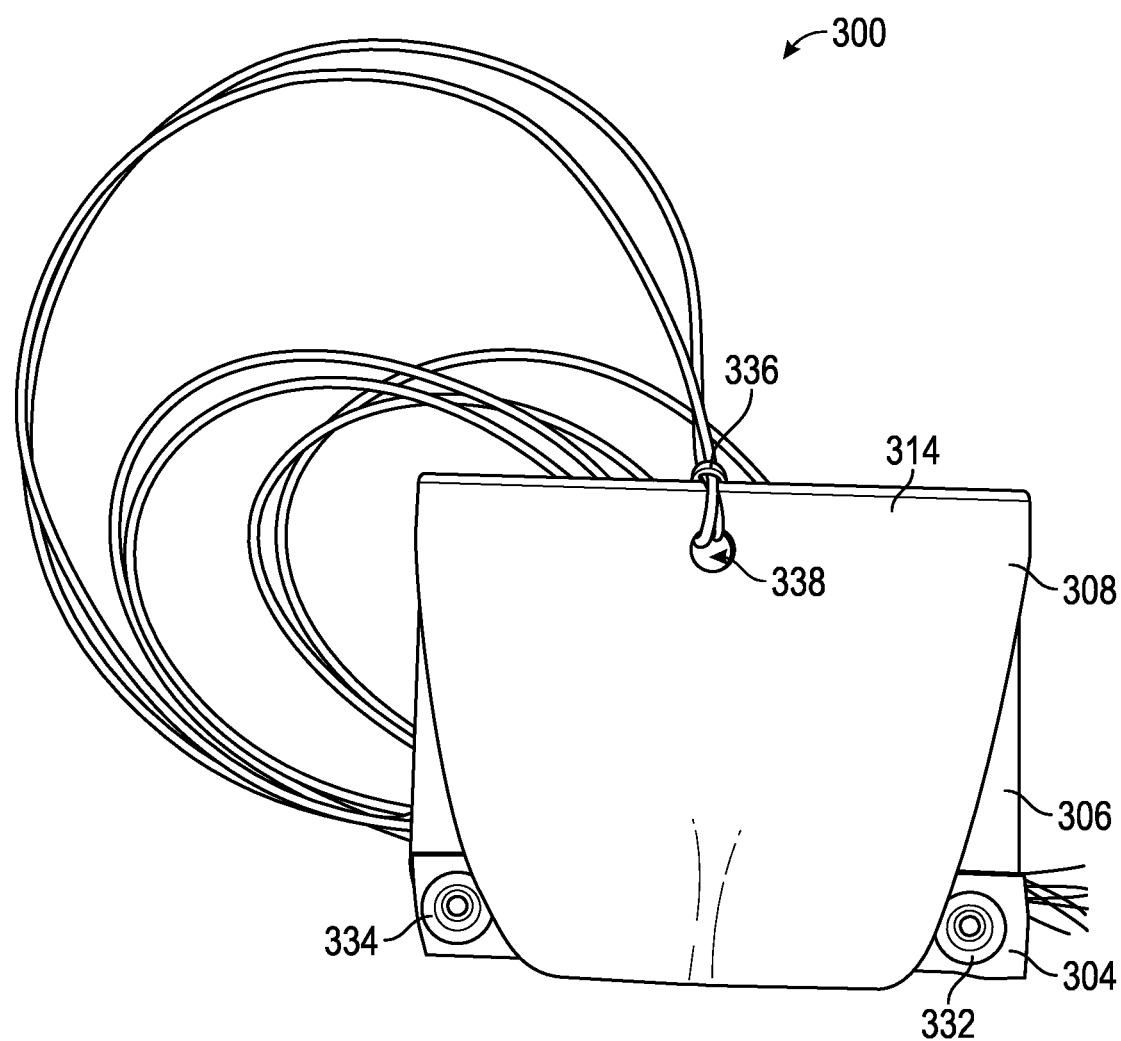
FIG. 9 is a top view of a game calling device, according to an embodiment.

FIG. 8-9 show an embodiment of a game calling device 300. Game calling device 300 includes a reed 304 coupled to a proximal end 330 of first member 306. In a specific embodiment, a reed 304 may comprise a strip of polymeric material fastened to first member 306. In a specific embodiment, reed 304 may be fastened to first member 306 with a first fastener 332 and a second fastener 334. In a specific example, first fastener 332 and/or second fastener 334 may comprise a rivet. In a particular implementation, reed 304 may be "loose" or "pre-tensioned" while folded structure 314 is open. As shown in FIG. 9, game calling device 300 may include a lanyard 336. In an embodiment, lanyard 336 may be coupled to folded structure 314. In an embodiment, a lanyard 336 may be disposed through an orifice 338 disposed in second member 308 and an orifice (not shown) disposed in first member 306.

Figure 10:
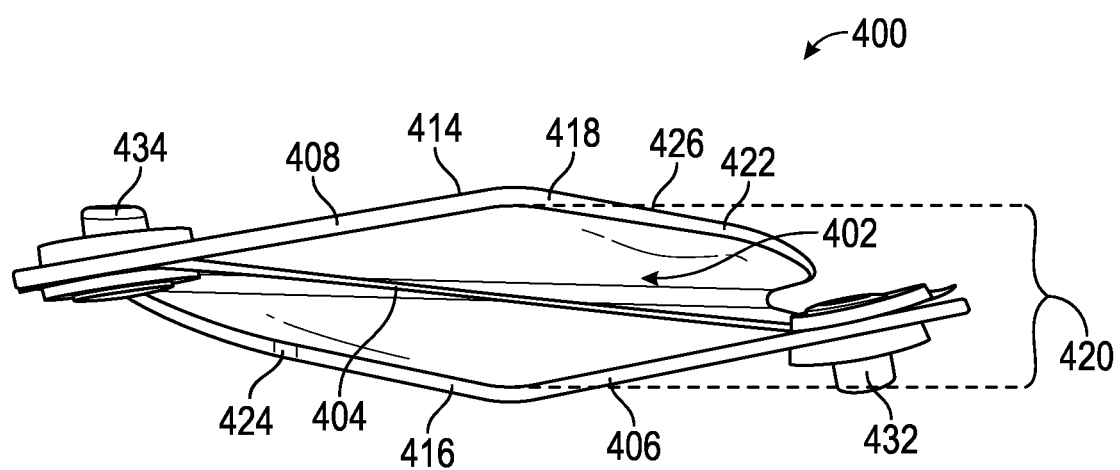
FIG. 10 is a front view of a game calling device, according to an embodiment.
Figure 11:
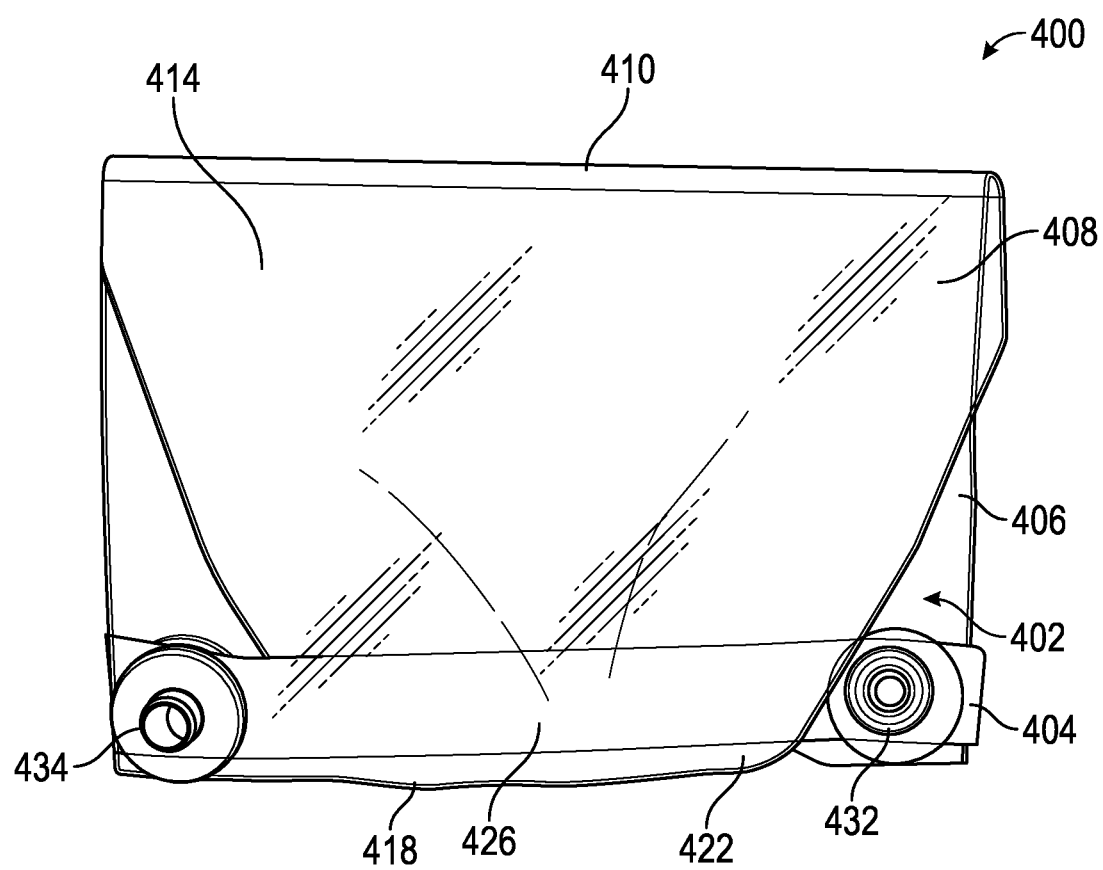
FIG. 11 is a top view of a game calling device, according to an embodiment.

FIGS. 10-11 show an embodiment of a game calling device 400. In an embodiment, a game calling device 400 may comprise: a cavity 402; and a reed 404 disposed within cavity 402, wherein: cavity 402 is deformable while air is passed over a reed to make a game call sound; and a tension of reed 404 varies responsive to a force applied by a user to cavity 402 to modulate a pitch in game call sound. In an implementation, a cavity 402 may be formed between a first member 406 and a second member 408, wherein first member 406 and second member 408 are pressed toward each other responsive to a force. In an aspect, first member 406 and second member 408 may be coupled by a hinge 410 at a distal end 412 of game calling device 400. In an aspect, first member 406, second member 408, and hinge 410 may comprise a folded structure 414 defining cavity 402. In an embodiment, a proximal edge 416 of first member 406 and a proximal edge 418 of second member 408, at least in part, may form an air passage 420 that is in communication with cavity 402. In a specific implementation, proximal edge 418 of second member 408 may comprise a first contact point 422 and proximal edge 416 of first member 406 may comprise a second contact point 424 that are adapted to contact and alter a tension of reed 404 as first member 406 and/or second member 408 are pressed toward each other. In a specific example, first contact point 422 may comprise a first flap 426 of second member 408. In a specific example, second contact point 424 may comprise a first flap of first member 406.

In an embodiment, game calling device 400 includes a reed 404 coupled to a proximal end 430 of first member 406. In a specific implementation, reed 404 may comprise a strip of polymeric material fastened to first member 406 and to second member 408. In a specific implementation, reed 404 may be fastened to first member 406 with a first fastener 432 and to second member 408 with a second fastener 434. In a specific example, first fastener 432, second fastener 434, or both may comprise a rivet. In an aspect, reed 404 is disposed within first air passage 420 opposite hinge 410 and extends transversally across first air passage 420. In another aspect, reed 404 may be disposed above (i.e., over), and extending parallel to, proximal edge 416 of first member 406. In an implementation, reed 404 may be "loose" or "pre-tensioned" while folded structure 414 is open. In a specific example, reed 404 is pre-tensioned.

Figure 12A:
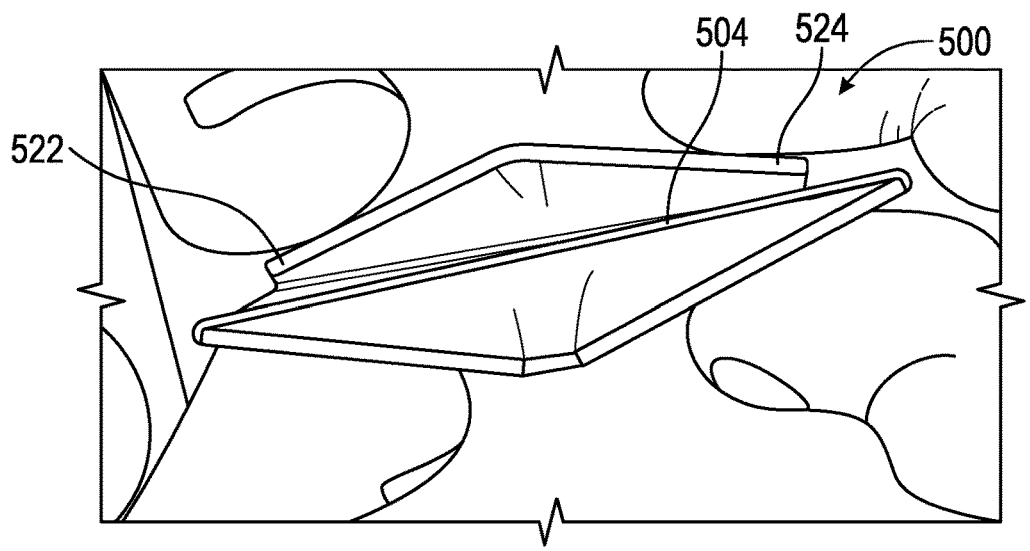
FIG. 12A is a front view of a game calling device in a first configuration, according to an embodiment.
Figure 12B:
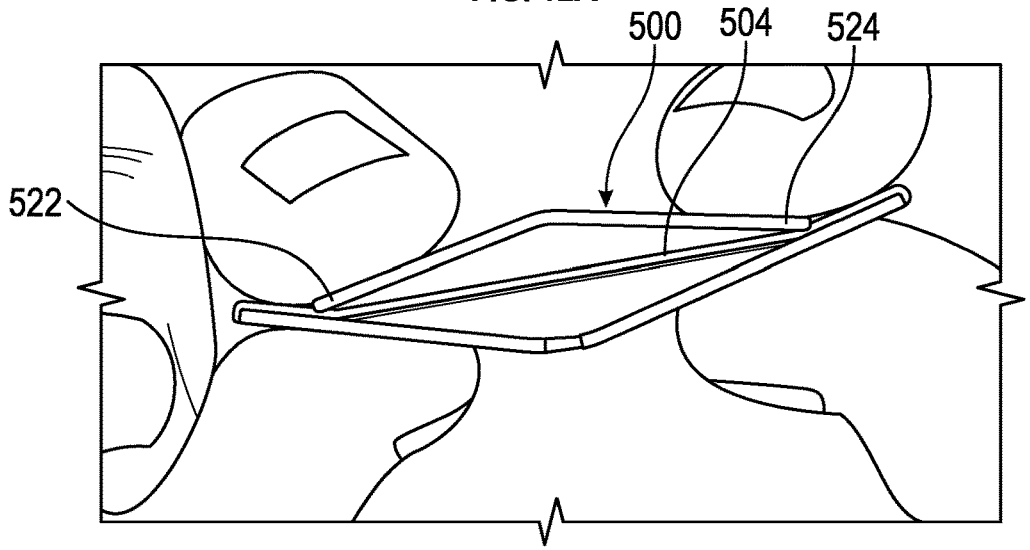
FIG. 12B is a front view of a game calling device in a second configuration, according to an embodiment.
Figure 12C:
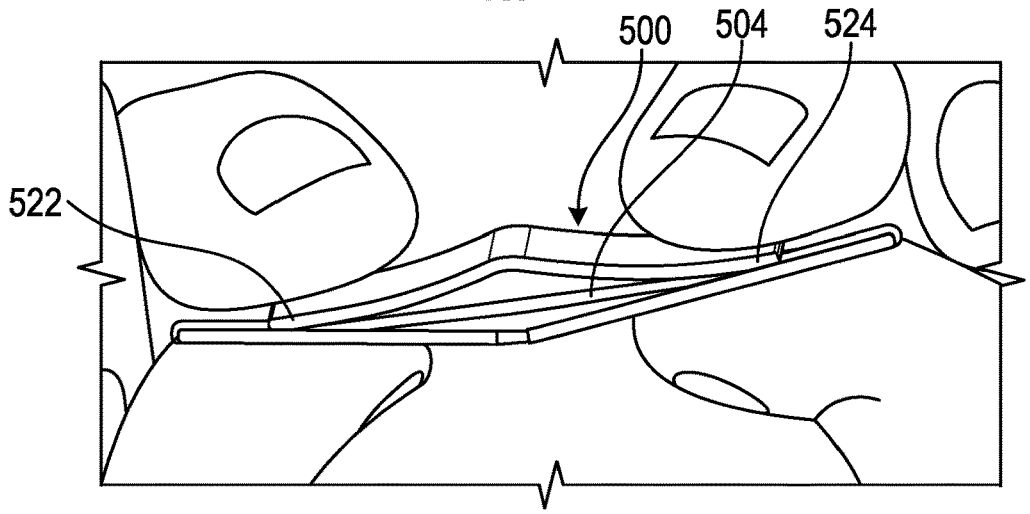
FIG. 12C is a front view of the game calling device in a third configuration, according to an embodiment.
Figure 13:
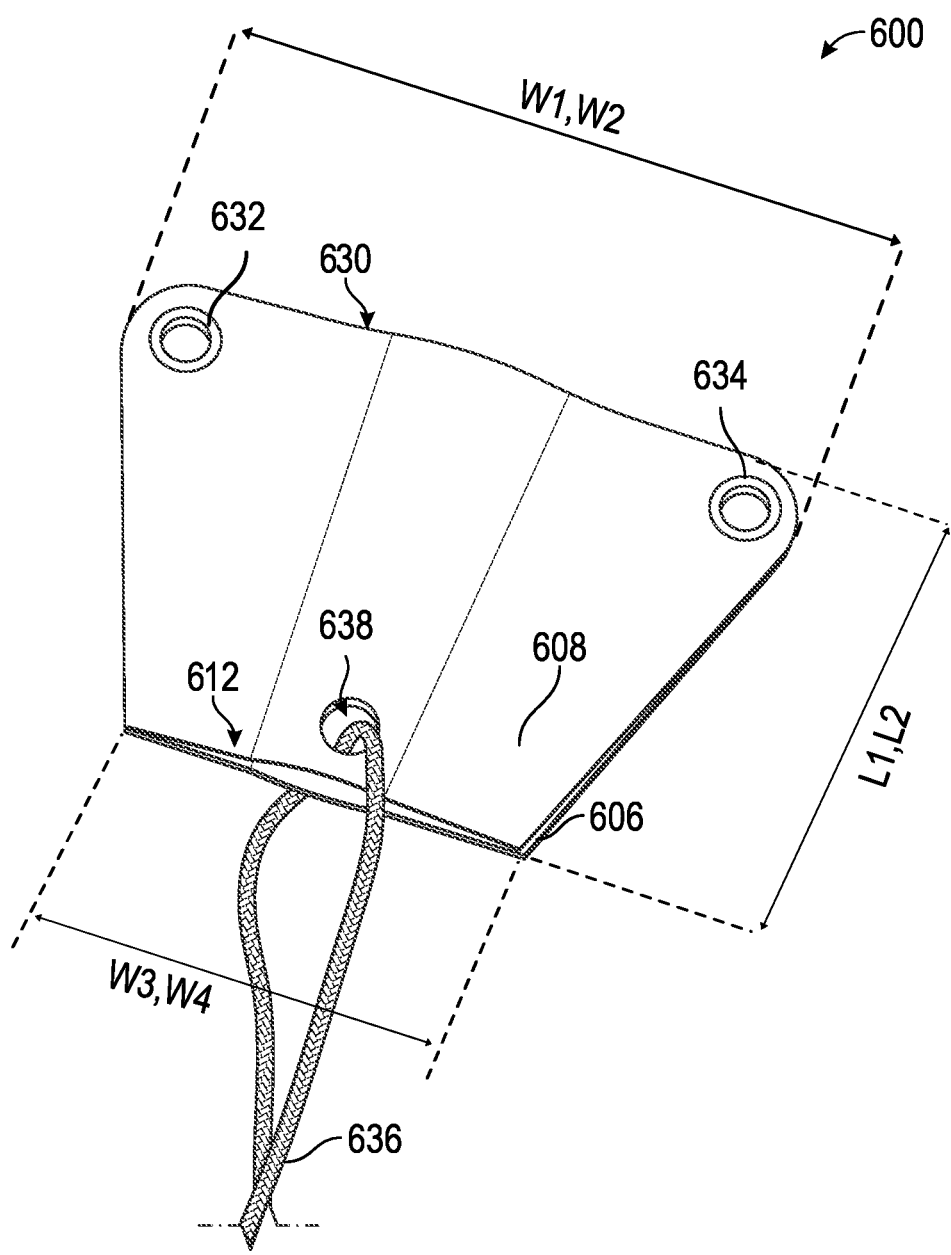
FIG. 13 is a top view of a game calling device, according to an embodiment.
Figure 14:
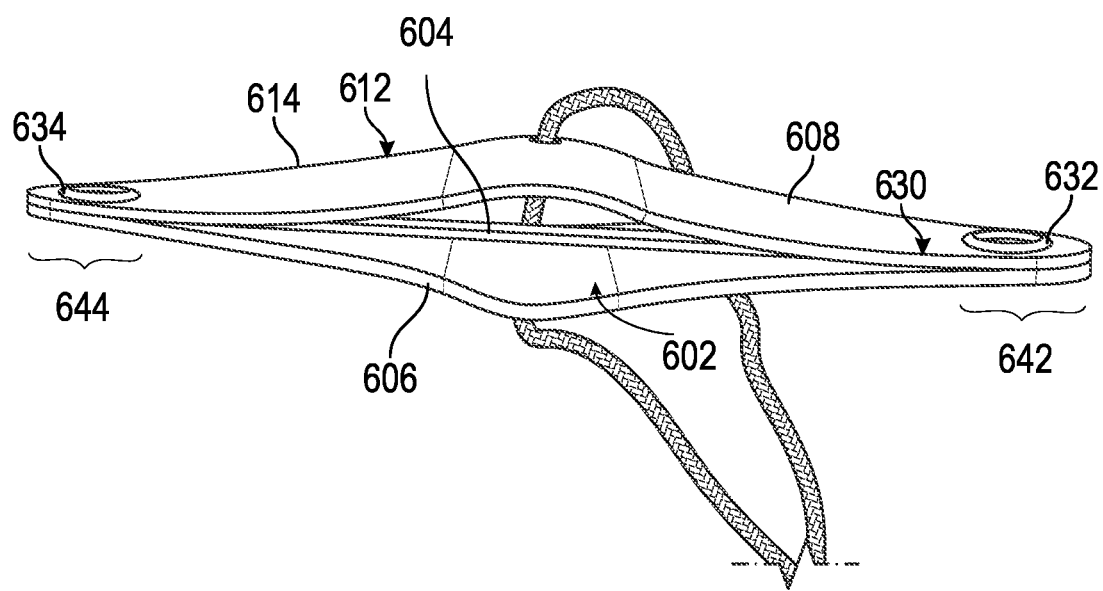
FIG. 14 is a front view of a game calling device, according to an embodiment.
Figure 15:
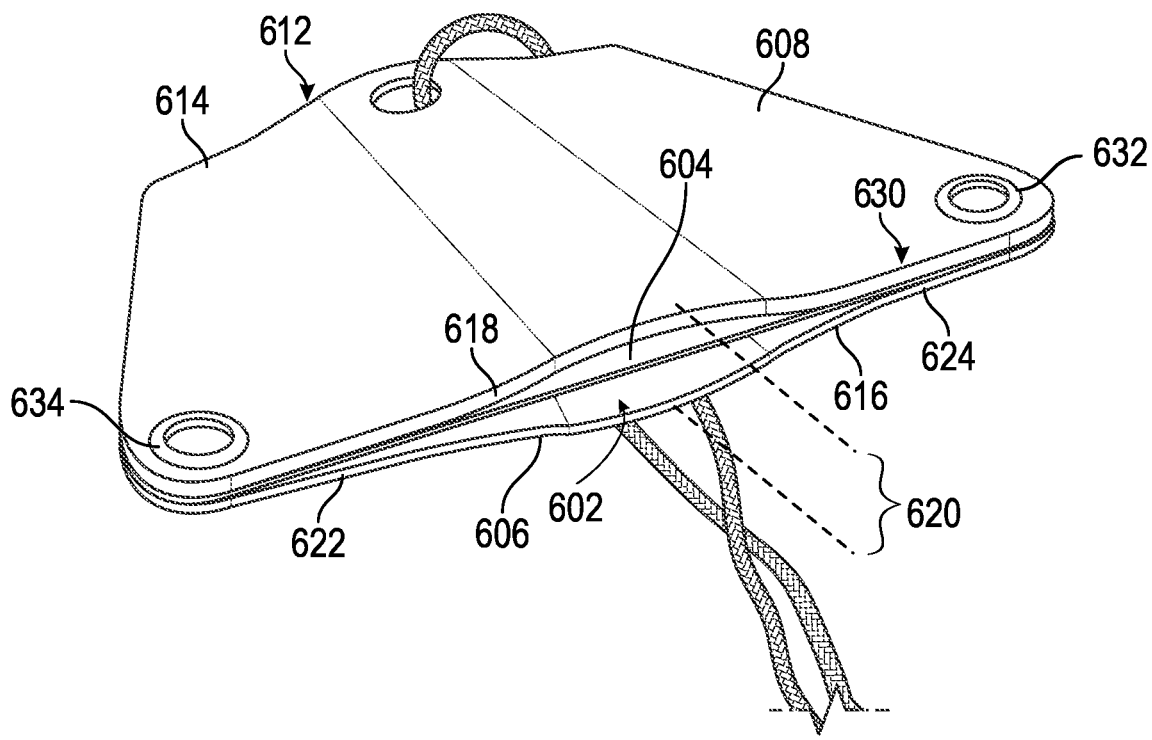
FIG. 15 is a front perspective view of a game calling device, according to an embodiment.
Figure 16:
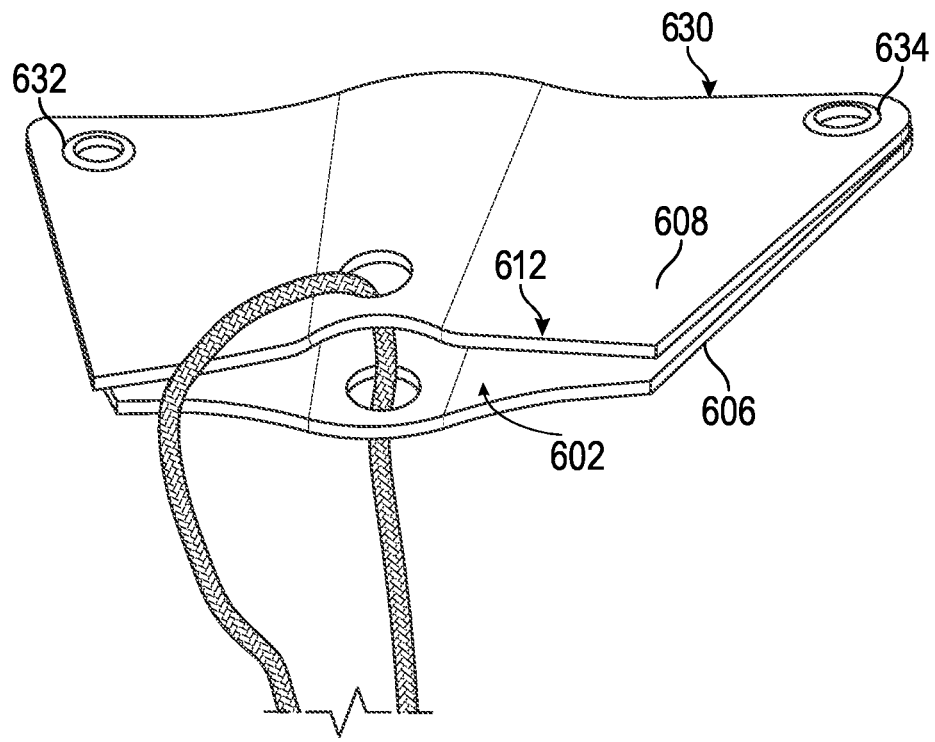
FIG. 16 is a rear perspective view of a game calling device, according to an embodiment.
Figure 17:
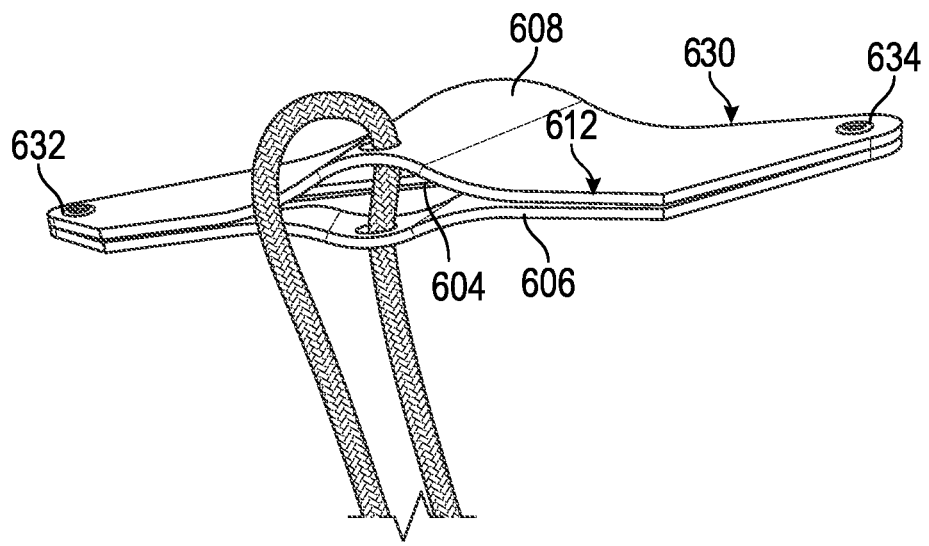
FIG. 17 is a rear perspective view of a game calling device, according to an embodiment.

FIGS. 12A-12C showing a front view of a game calling device 500 in various stages of compression where a first and a second member are being forced toward each other. In an embodiment, FIG. 12A shows an "open" configuration (also referred to herein as a "first" configuration) where no force, or only a limited force has been applied to a first member and second member such that no contact point 522, 524 located on either a first member or a second member according to an embodiment as described herein is in contact with a reed 504. FIG. 12B shows a calling device 500 in a "closed" configuration (also referred to herein as "second" configuration), wherein a first member and a second member have been forced towards each other such that a contact point 522, or multiple contact points 522, 524, located on either a first member or a second member according to an embodiment as described herein are first brought into contact with a reed 504. FIG. 12C shows game calling 500 in a "closed and compressed" configuration (also referred to herein as a third configuration), wherein a first member and a second member have been forced towards each other such that a contact point 522, or multiple contact points 522, 524, located on either a first member or a second member according to an embodiment as described herein are in contact with a reed 504 and a force has caused a deformation of a cavity such that a height of an air passage is reduced from 99% to 0% of a height of an air passage in its "closed" configuration.

FIGS. 13-17 show an embodiment of a game calling device 600. In an embodiment, a game calling device 600 may comprise: a cavity 602; and a reed 604 disposed within cavity 602, wherein: cavity 602 is deformable while air is passed over reed 604 to make a game call sound; and a tension of reed 604 varies responsive to a force applied by a user to cavity 602 to modulate a pitch in game call sound. In an implementation, reed 604 may comprise a tensile strength in the machine direction, a tensile strength in the cross direction, an impact strength, a modulus of elasticity, or a combination thereof. In a specific implementation, reed 604 may comprise an impact strength of at least 40 g to not greater than 1140 g, a tensile strength in the machine direction of at least 550 PSI to not greater than 4400 PSI, a modulus of elasticity of at least 15 MPa and not greater than 30 MPa, or a combination thereof.

In an implementation, cavity 602 may be formed between first member 606 and second member 608, wherein first member 606 and second member 608 are pressed toward each other responsive to a force. In an aspect, first member 606 and second member 608 may be coupled together at a first location by a first lap joint 638 and at a second location by a second lap joint 640, wherein first lap joint 638 and second lap joint 640 are both located on a proximal end 630 of game calling device 600. In an aspect, first member 606, second member 608, first lap joint 638 and second lap joint 640 may comprise a structure 614 defining cavity 402. In an embodiment, a proximal edge 616 of first member 606 and a proximal edge 618 of second member 608, at least in part, may form an air passage 620 that is in communication with cavity 602. In a specific implementation, proximal edge 616 of first member 606 and proximal edge 618 of second member 608 may comprise a first contact point 622 and a second contact point 624 that are adapted to contact and alter a tension of reed 604 as first member 606 and/or second member 608 are pressed toward each other and come in contact with reed 604.

In an embodiment, reed 604 may be fixedly fastened to two locations (i.e., a first location and a second location) of structure 614 that forms cavity 602. In an aspect, reed 602 may be fixedly fastened so as to substantially eliminate slippage of reed 602 relative to the first location and second location of the structure while a force is applied to and/or released from the structure to modulate the pitch. In a specific implementation, reed 604 may be fixedly fastened to structure 614 at first lap joint 638 and at second lap joint 640. In a specific example, first lap joint 638 may comprise a first end of reed 604 disposed between and fixedly fastened to first member 606 and second member 608 with a first fastener 632. In another specific example, second lap joint 640 may comprise a second end of reed 604 disposed between and fixedly fastened to first member 606 and second member 608 with a second fastener 634. In an implementation, first fastener 632 or second fastener 634 may comprise a rivet, a grommet, an eyelet, or a combination thereof.

According to an embodiment, game calling device 600 may enable greater control and reproducibility of a pitch while disposed in a user's mouth. This may be achieved, at least in part, by selecting a particular reed material (e.g., material having a particular chemical composition) and forming reed 604 to particular dimensions to impart particular properties to reed 604. For example, such particular properties of reed 604 (e.g., tensile strength in a machine direction, tensile strength in a cross direction, impact strength and/or modulus of elasticity) may enable reed 604 to be controllably maintained at a proper tension for a desired pitch while game calling device 600 is in use. This may avoid some of the drawbacks of latex reeds (e.g., latex bands) including excessive deformation and inability to maintain tension that may undermine control and reproducibility of pitch. Additionally, fixed attachment of reed 604 to first member 606 and second member 608 at fasteners 632 and 634 may further enhance control and reproducibility of pitch by avoiding problems of slippage with reeds formed from latex bands that are merely wrapped over a structure forming a game calling device, for example.

In a particular embodiment, a wild game calling device may comprise: a cavity; and a reed disposed within the cavity, wherein: the cavity is deformable while air is passed over the reed to make a game call sound; and a tension of the reed varies responsive to a force applied by a user to the cavity to modulate a pitch in the game call sound. The cavity may be formed between a first member and a second member; wherein the first member and second member are pressed toward each other responsive to the force. The first member and the second member may be coupled by a hinge at a distal end of the game calling device. The first member, the second member, and the hinge may comprise a folded structure defining the cavity. The folded structure may include a clam shell structure, or a combination thereof. A proximal edge of the first member and a proximal edge of the second member, at least in part, may form a first air passage that is in communication with the cavity. The proximal edge of the first member or of the second member may comprise a first contact point, or a second contact point, or a combination thereof, that are adapted to contact and alter the tension of the reed as the first member and/or the second member are pressed toward each other. The first contact point or the second contact point, or a combination thereof may comprise an integral flap of the second member. In various implementations, a sound frequency of the wild game calling device may be modulated during use. In an embodiment, when in use a frequency of a game calling device is modulated as pressure is applied to a first member, a second member, or a combination thereof. In an embodiment, a first member, a second member, and a hinge may be a single continuous piece, separate pieces that are joined together, or a combination thereof. In an embodiment, a first member, a second member, and a hinge comprise a single continuous piece (also referred to herein as being "integral" with each other). In an embodiment, a first member, a second member, and a hinge comprise separate pieces that are coupled together. In an embodiment, a first member, a second member, and a hinge are contiguous with each other.

In an embodiment, a wild game calling device may comprise: a body (also referred to herein as a "frame"); a reed; and a reed tensioner. In a specific implementation, a body may comprise: a first member (also referred to herein as a "bottom" member, in reference to viewing a game calling device from a front); a second member (also referred to herein as a "top" member, in reference to viewing a game calling device from a front); and a hinge. In an aspect, a first member and a second member may be joined together by a hinge at a distal end of a body to comprise a folded structure defining an open interior space (also referred to herein as a "cavity"). In a specific example, a hinge may extend transversally along a distal end of a body. In a specific implementation, a proximal edge of a first member and a proximal edge of a second member may define a first air passage (also referred to herein as a "mouthpiece") in communication with an interior space. In an embodiment, a reed may be disposed within a first air passage opposite a hinge and extend transversally across a first air passage. In an embodiment, a reed may be coupled to a proximal end of a first member and be disposed above and extending parallel to a proximal edge of a first member. In an embodiment, air blown through a first air passage causes a reed to produce a game call sound. In an embodiment, a reed tensioner may comprise a first contact point disposed on a proximal edge of a second member. In an embodiment, a reed tensioner is adapted to alter a tension of a reed as a first member and second member are pressed toward each other and a first contact point is in contact with a reed.

In an embodiment, a method of making a wild game calling device may comprise: folding a deformable material to form a cavity; and disposing a reed within a cavity, wherein: a cavity is deformable while air is passed over a reed to make a game call sound; and a tension of a reed varies responsive to a force applied by a user to a cavity to modulate a pitch in a game call sound. In an embodiment, "folding a deformable material" may comprise: forming a folded structure comprising a first member and a second member that are joined by an integral hinge, wherein a cavity is disposed between a first member and second member; folding a right side proximal corner of a first member to form a first right side angular flap, wherein a tip of a first right side angular flap faces towards a second member; folding a left side proximal corner of a first member to form a first left side angular flap, wherein a tip of a first left side angular flap faces towards a second member; folding a right side proximal corner of a second member to form a second right side angular flap, wherein a tip of a second right side angular flap faces towards a first member; and folding a left side proximal corner of a second member to form a second left side angular flap, wherein a tip of a second left side angular flap faces towards a first member. In an embodiment, "disposing a reed within the cavity" may comprise: attaching a reed to a proximal edge of a first member within a cavity.

In an embodiment, a method of making a wild game calling device may comprise: disposing a first end of a reed between a proximal edge of a first member and a proximal edge of a second member at a first location; fastening together the first end of the reed, the proximal edge of the first member, and the proximal edge of the second member at the first location to form a first lap joint; disposing a second end of a reed between a proximal edge of a first member and a proximal edge of a second member at a second location; fastening together the second end of the reed, the proximal edge of the first member, and the proximal edge of the second member at the second location to form a second lap joint, wherein: a cavity is formed between the first member and the second member; the first member, the second member, the first lap joint and the second lap joint comprise a structure defining the cavity; the cavity is deformable while air is passed over the reed to make a game call sound; and a tension of a reed varies responsive to a force applied by a user to the cavity to modulate a pitch in the game call sound as the first member and second member are pressed toward each other responsive to the force applied.

In various implementations of the embodiments described herein, the dimensions of the proximal edge of the first member and the proximal edge of the second member may be the same or different. In various specific implementations, the proximal edge of the first member may comprises a width ("W1") and the proximal edge of the second member may comprise a width ("W2"). In a specific example, width "W2" is less than (i.e., is smaller or is narrower) than the width "W1." In various implementations, the width W2 and the width W1 may have a varying ratio to each other. In a specific example, a ratio W2:W1 may be not greater than about 0.95, such as not greater than 0.90, not greater than 0.85, not greater than 0.80, or not greater than 0.75. In a specific example, a ratio W2:W1 may not be less than about 0.45, such as not less than 0.50, not less than 0.55, not less than 0.60, not less than 0.65, or not less than 0.70. In an implementation, the ratio W2:W1 may have a value in a range of any of the preceding minimum and maximum values. In a specific example, the ratio W2:W1 may comprise a value not greater than about 0.95 and not less than about 0.45. In another specific implementation, width W1 and width W2 may be equal or substantially equal. In a specific example, the ratio W2:W1 may have a value ranging from about 0.95 to 1.0.

In various implementations of the embodiments described herein, the width W1 of the proximal edge of the first member may vary. In a specific example, the width W1 may comprise a value of not greater than about 4.0 inches, such as not greater than 3.75 inches, not greater than 3.5 inches, not greater than 3.25, not greater than 3.0 inches, not greater than 2.75 inches, not greater than 2.5 inches, or not greater than 2.25 inches. In a specific example, the width W1 may comprise a value of not less than about 0.5 inches, such as not less than 0.75 inches, not less than 1.0 inch, not less than 1.25 inches, not less than 1.5 inches, or not less than 2.0 inches. In an implementation the width W1 may comprise a value in a range of any of the preceding minimum and maximum values. In a specific example, a width W1 may comprise a value of not greater than about 4.0 inches and not less than about 0.5 inches, such as not greater than about 3.0 inches and not less than about 1.25 inches.

In various implementations of the embodiments described herein, the first member may comprise a length ("L1") that may vary. In a specific example, the length L1 may comprise a value not greater than about 3.0 inches, such as not greater than 2.75 inches, not greater than 2.5 inches, not greater than 2.25, not greater than 2.0 inches, or not greater than 1.75 inches. In a specific example, the length L1 may comprise a value not less than about 0.25 inches, such as not less than 0.5 inches, not less than 0.75 inches, not less than 1.0 inch, not less than 1.25 inches, or not less than 1.5 inches. In an implementation, the length L1 may comprise a value in a range of any of the preceding minimum and maximum values. In a specific example, the length L1 may comprise a value of not greater than about 3.0 inches and not less than about 0.25 inches, such as not greater than about 2.5 inches and not less than about 1.00 inch.

In various implementations of the embodiments described herein, the first member may comprise a distal edge having a width ("W3") that may vary. In a specific example, the width W3 may comprise a value of not greater than about 4.0 inches, such as not greater than 3.75 inches, not greater than 3.5 inches, not greater than 3.25, not greater than 3.0 inches, not greater than 2.75 inches, not greater than 2.5 inches, or not greater than 2.25 inches. In a specific example, the width W3 may comprise a value of not less than about 0.4 inches, such as not less than 0.5 inches, not less than 0.75 inches, not less than 1.0 inch, not less than 1.25 inches, not less than 1.5 inches, or not less than 2.0 inches. In an implementation, the width W3 may comprise a value in a range of any of the preceding minimum and maximum values. In a specific example, the width W3 may comprise a value of not greater than about 4.0 inches and not less than about 0.4 inches.

In various implementations of the embodiments described herein, the width W3 may be the same as or different than a width W4, described below. In specific implementations, width W3 is the same as width W4.

In various implementations of the embodiments described herein, the second member may comprise a proximal edge having a width ("W2"). In a specific implementation width W2 may be less than width W1. In another specific implementation, width W2 may be the same or substantially the same as width W1. In a specific example, the width W2 may comprise a value of not greater than about 4.0 inches, such as not greater than 3.75 inches, not greater than 3.5 inches, not greater than 3.25, not greater than 3.0 inches, not greater than 2.75 inches, not greater than 2.5 inches, not greater than 2.25, not greater than 2.0 inches, or not greater than 1.75 inches. In a specific example, the width W2 may comprise a value of not less than about 0.25 inches, such as not less than 0.5 inches, not less than 0.75 inches, not less than 1.0 inches, or not less than 1.5 inches. In an implementation, the width W2 may comprise a value in a range of any of the preceding minimum and maximum values. In a specific example, the width W2 may comprise a value of not greater than 4.0 inches and not less than about 0.5 inches, such as not greater than about 3.0 inches and not less than about 1.25 inches.

In various implementations of the embodiments described herein, the second member may comprise a length ("L2") that may vary. In a specific example, the length L2 may comprise a value not greater than about 3.0 inches, such as not greater than 2.75 inches, not greater than 2.5 inches, not greater than 2.25, not greater than 2.0 inches, or not greater than 1.75 inches. In a specific example, the length L2 may comprise a value of not less than about 0.25 inches, such as not less than 0.5 inches, not less than 0.75 inches, not less than 1.0 inch, not less than 1.25 inches, or not less than 1.5 inches. In an implementation, the length L2 may comprise a value in a range of any of the preceding minimum and maximum values. In a specific example, the length L2 may comprise a value of not greater than about 3.0 inches and not less than about 0.25 inches, such as not greater than about 2.5 inches and not less than about 1.00 inch.

In various implementations of the embodiments described herein, the second member may comprise a distal edge having a width ("W4") that may vary. In a specific example, the width W4 may comprise a value that is not greater than about 4.0 inches, such as not greater than 3.75 inches, not greater than 3.5 inches, not greater than 3.25, not greater than 3.0 inches, not greater than 2.75 inches, not greater than 2.5 inches, or not greater than 2.25 inches. In a specific example, the width W4 may comprise a value that is not less than about 0.25 inches, such as not less than 0.4 inches, not less than 0.5 inches, not less than 0.75 inches, not less than 1.0 inch, not less than 1.25 inches, not less than 1.5 inches, or not less than 2.0 inches. In an implementation, the width W4 may comprise a value in a range of any of the preceding minimum and maximum values. In a specific example, the width W4 may comprise a value of not greater than about 4.0 inches and not less than about 0.25 inches, such as not greater than about 4.0 inches and not less than about 0.5 inches, not greater than about 3.0 inches and not less than about 0.25 inches, or greater than about 3.0 inches and not less than about 0.4 inches.

In various implementations of the embodiments described herein, width W4 may be the same as or different than width W3, described above. In specific implementations, width W4 is the same as width W3.

In various implementations of the embodiments described herein, the wild game calling device may comprise various materials, various properties, or a combination thereof. In various implementations, the first member, the second member, and the hinge may be comprised of the same material or different materials. In a specific example, the first member, the second member, and the hinge may be comprised of the same material. In a specific example, the first member or the second member may be comprised of the same material as the hinge. In a specific example, the first member or the second member may be comprised of a different material than the hinge. In various implementations, the first member, the second member, the hinge, or a combination thereof may comprise a flexible, resilient, material. In a specific implementation, the first member, the second member, or a combination thereof may comprise a polymer, a metal, an alloy, a composite, a wood, a glass, a ceramic, a natural fiber, a horn material, or a combination thereof. In a specific example, the first member, the second member, the hinge, or a combination thereof may be comprised of polyvinyl chloride (PVC), polyvinyl chloride acetate (PVCA), polylactic acid (PLA), or a combination thereof. In a specific example, the first member, the second member, or a combination thereof may be comprised of a thermoplastic acrylic-polyvinyl chloride polymer mixture, such as Kydex®.

In various implementations of the embodiments described herein, the wild game call may comprise a hinge that defines a portion of the body. In various implementations, the hinge may define a portion of a distal edge of the body. In specific example, the hinge defines at least 10% of the distal edge of the body, such at least 15%, at least 20%, at least 25%, at least 30%, at least 40%, at least 50%, at least 55%, at least 60%, at least 65%, at least 70%, at least 75%, at least 80%, at least 85%, or at least 90% of the distal edge of the body.

In various implementations of the embodiments described herein, the hinge may comprise a single continuous piece of material, contiguous pieces of material, separate mechanical pieces, or a combination thereof. In a specific implementation, the hinge may comprise a separate piece coupled to the first member, the second member, or a combination thereof. In a specific example, the hinge comprises a single continuous piece of material. In another specific example, the hinge and at least the first member or the second member are comprised of a continuous piece of material.

In various implementations of the embodiments described herein, the type of hinge may vary. In a specific implementation, the hinge may comprise an integral hinge, a living hinge, a fold, a bridge, or a combination thereof. In another specific example, the hinge may comprise a folding hinge, a mortise hinge, a barrel hinge, or a combination thereof.

In various implementations of the embodiments described herein, the hinge may have a width that is the same or different than width W3, described above. In a specific implementation, the hinge may have a width that is the same or different than width W4, as described above. In a specific example, the width of the hinge is the same as width W3 and width W4. In a specific example, the width of the hinge is different than width W3 and width W4. In a specific example, the hinge has a width that is the same as width W3 or width W4.

In various implementations of the embodiments described herein, a reed may comprise different types of reeds. In an implementation, the reed may comprise an "open reed" (i.e., wherein the reed is partially to fully exposed to view within the first air passage), or a "closed" reed, (i.e., wherein the reed is fully enclosed within the body of the game call and not exposed to view), or a combination thereof. In various implementations of the embodiments described herein, the reed may comprise different forms, shapes, or configurations. In an implementation, the reed may comprise a band, a belt, a loop, a diaphragm, or a strip, or a combination thereof. In a specific example, the reed comprises an endless band. In another specific example, the reed comprises a strip.

In various implementations of the embodiments described herein, a thickness of a reed (e.g., reed 604) may vary. In a specific implementation, the reed may comprise a thickness of at least about 1 mil, such as at least 2 mil, at least 3 mil, at least 4 mil, at least 5 mil, at least 6 mil, at least 7 mil, at least 8 mil, at least 9 mil, or at least 10 mil. In a specific implementation, the reed may comprise a thickness not greater than about 25 mil, such as not greater than 24 mil, not greater than 23 mil, not greater than 22 mil, not greater than 21 mill, not greater than 20 mil, not greater than 19 mil, not greater than 18 mil, not greater than 17 mil, not greater than 16 mil, not greater than 15 mil, not greater than 14 mil, not greater than 13 mil, not greater than 12 mil, not greater than 11 mil, or not greater than 10 mil. In an implementation, the thickness may comprise a value in a range of any of the preceding minimum and maximum values. In a specific example, the reed may comprise a thickness of at least about 1 mil and not greater than about 25 mil, such as at least about 2 mil and not greater than 20 mil, at least about 3 mil and not greater than 17 mil, at least 5 mil and not greater than 15 mil, at least 7 mil and not greater than about 13 mil, or at least about 9 mil and not greater than about 11 mil.

In various implementations of the embodiments described herein, a width of a reed (e.g., reed 604) may vary. In a specific implementation, the reed may comprise a width of at least about 0.25 in, such as at least 0.27 in, at least 0.29 inches, at least 0.30 in, at least 0.31 in, at least 0.33 in, or at least 0.35 in. In a specific implementation, the reed may comprise a width not greater than about 0.50 in, such as not greater than 0.49 in, not greater than 0.47 in, not greater than 0.45 in, not greater than 0.43 in, not greater than 0.41 in, or not greater than 0.40 in. In a specific example, the reed may comprise a width of at least about 0.25 in. and not greater than about 0.50 in., such as at least about 0.30 in. and not greater than 0.45 in, or at least about 0.35 in. and not greater than 0.40 in.

In various implementations of the embodiments described herein, a length of a reed (e.g., reed 604) may vary. As used herein, reed "length" will be understood to mean the "flat length" when the reed comprises an endless band or the length end to end when the reed comprises a strip of material. In a specific implementation, the reed may comprise a length of at least about 1.5 in, such as at least 1.55 in, at least 1.65 in, at least 1.75 in., at least 1.85 in., at least 1.95 in, at least 2.0 in, at least 2.05 in, at least 2.1 in, at least 2.15 in, at least 2.2 in, at least 2.25 in, at least 2.3 in, or at least 2.35 in. In a specific implementation, the reed may comprise a length not greater than about 2.85 in, such as not greater than 2.8 in, not greater than 2.75 in, not greater than 2.7 in, not greater than 2.65 in, not greater than 2.6 in, not greater than 2.55 in, not greater than 2.5 in, not greater than 2.45 in, or not greater than 2.4 in. In an implementation, the reed length may comprise a value in a range of any of the preceding minimum and maximum values. In a specific example, the reed may comprise a length of at least about 1.5 in and not greater than about 2.85 in, such as at least about 1.75 in and not greater than about 2.80 in, at least about 1.9 in and not greater than about 2.75 in, such as at least about 2.1 in and not greater than about 2.65 in, or at least about 2.2 in and not greater than about 2.45 in.

In various implementations of the embodiments described herein, a reed (e.g., reed 604) may comprise various materials. In an implementation, the reed may comprise a thermoplastic polymer, a thermoset polymer, or a combination thereof. In a specific implementation, the reed may comprise a vinyl polymer. In an example, a vinyl polymer may comprise a polyvinyl chloride (PVC) polymer, an ethylene vinyl acetate (EVA) polymer, a polyethylene vinyl acetate (PEVA) polymer, a polyvinyl acetate (PVA) polymer, a polyvinyl butyral (PVB) polymer, or a combination thereof. In specific example, the reed may comprise a polyethylene, a polypropylene, a polyvinyl chloride, a polyvinyl acetate, a polyacrylonitrile, mixtures thereof, or a combination thereof. In an aspect, the polyethylene may comprise a polyethylene or a modified polyethylene, such as an ethylene copolymer consisting of a major portion of ethylene in combination with a minor portion of some other monomer, or a mixture of polyethylene with a lesser amount of other polymers. In a specific example, the polyethylene may comprise a low density polyethylene (LDPE), a high density polyethylene (HDPE), an ultra high density polyethylene (UHDPE), mixtures thereof, or a combination thereof. In a specific example, the polyethylene may comprise a low density polyethylene.

In various implementations of the embodiments described herein, a reed (e.g., reed 604) may comprise a polymer sheeting or a polymer film. In a specific implementation, the reed may comprise a polyethylene sheeting or a polyethylene film that meets or exceeds properties in accordance with ASTM D4397-16 (Standard Specification for Polyethylene Sheeting for Construction, Industrial, and Agricultural Applications), ASTM D4635-16 (Standard Specification for Plastic Films Made from Low-Density Polyethylene and Linear Low-Density Polyethylene for General Use and Packaging Applications); ASTM D2103-15 (Standard Specification for Polyethylene Film and Sheeting), or a combination thereof. In a specific example, the reed may comprise low density polyethylene sheeting material that meets or exceeds properties in accordance with ASTM D4397-16 (Standard Specification for Polyethylene Sheeting for Construction, Industrial, and Agricultural Applications), ASTM D4635-16 (Standard Specification for Plastic Films Made from Low-Density Polyethylene and Linear Low-Density Polyethylene for General Use and Packaging Applications); ASTM D2103-15 (Standard Specification for Polyethylene Film and Sheeting), or a combination thereof.

In various implementations of the embodiments described herein, a reed (e.g., reed 604) may comprise a suitable electrical wrap material. Suitable electrical wrap materials may comprise a vinyl polymer, a polyethylene (PE) polymer, a crosslinked polyethylene polymer, a polyimide polymer (e.g., Kapton®), a rubber material, a polytetrafluoroethylene (PFE) polymer (e.g., Teflon®), a silicone polymer, a modified ethylene tetrafluoroethylene (ETFE) polymer, a combination thereof, and the like.

In various implementations of the embodiments described herein, reed material (e.g., reed material for reed 604) may have a particular tensile strength in the machine direction (also called in the art "lengthwise" or "long direction") in accordance with ASTM D882-18 (Standard Test Method for Tensile Properties of Thin Plastic Sheeting) and ASTM D638-14 (Standard Test Method for Tensile Properties of Plastics). In a specific example, the reed may comprise a tensile strength in the machine direction (also referred to herein as "tensile strength MD") of not less than 550 PSI, not less than 600 PSI, not less than 700 PSI, not less than 800 PSI, not less than 900 PSI, or not less than 1000 PSI. In a specific example, the reed may comprise a tensile strength in the machine direction of not greater than 4400 PSI, not greater than 4000 PSI, not greater than 3500 PSI, not greater than 3000 PSI, not greater than 2750 PSI, not greater than 2500 PSI, not greater than 2250 PSI, or not greater than 2100 PSI. In a particular implementation the reed may comprise a tensile strength in the machine direction within a range comprising any pair of the previous upper and lower limits. In a specific example, the reed may comprise a tensile strength in the machine direction in a range of not less than 550 PSI to not greater than 4400 PSI, such as not less than 700 PSI to not greater than 3500 PSI, not less than 900 PSI to not greater than 2750 PSI, or not less than 1000 PSI to not greater than 2250 PSI.

In various implementations of the embodiments described herein, reed material (e.g., reed material for reed 604) may have a particular tensile strength in the cross direction (also called in the art "crosswise" or "transverse direction") in accordance with ASTM D882-18 (Standard Test Method for Tensile Properties of Thin Plastic Sheeting) and ASTM D638-14 (Standard Test Method for Tensile Properties of Plastics). In a specific example, the reed may comprise a tensile strength in the cross direction (also referred to herein as "tensile strength TD") of not less than 420 PSI, not less than 500 PSI, not less than 600 PSI, not less than 700 PSI, not less than 800 PSI, or not less than 850 PSI. In a specific example, the reed may comprise a tensile strength in the cross direction of not greater than 4100 PSI, not greater than 3700 PSI, not greater than 3200 PSI, not greater than 2700 PSI, not greater than 2200 PSI, not greater than 2100 PSI, not greater than 2000 PSI, or not greater than 1900 PSI. In a particular implementation the reed may comprise a tensile strength in the cross direction within a range comprising any pair of the previous upper and lower limits. In a specific example, the reed may comprise a tensile strength in the cross direction in a range of not less than 420 PSI to not greater than 4100 PSI, such as not less than 600 PSI to not greater than 3200 PSI, not less than 700 PSI to not greater than 2100 PSI, or not less than 850 PSI to not greater than 1900 PSI.

In various implementations of the embodiments described herein, reed material (e.g., reed material for reed 604) may have a particular impact strength in accordance with ASTM D1709-22 (Standard Test Methods for Impact Resistance of Plastic Film by the Free-Falling Dart Method). In a specific example, the reed may comprise an impact strength of not less than 40 g, not less than 85 g, not less than 125 g, not less than 175 g, not less than 250 g, or not less than 275 g. In a specific example, the reed may comprise an impact strength of not greater than 1100 g, not greater than 900 g, not greater than 800 g, not greater than 700 g, not greater than 650 g, not greater than 600 g, not greater than 575 g, or not greater than 550 g. In a particular implementation the reed may comprise an impact strength within a range comprising any pair of the previous upper and lower limits. In a specific example, the reed may comprise an impact strength in a range of not less than 40 g to not greater than 1100 g, such as not less than 175 g to not greater than 650 g, or not less than 275 g to not greater than 550 g.

In various implementations of the embodiments described herein, reed material (e.g., reed material for reed 604) may have a particular elongation at break in the machine direction (also called in the art "lengthwise" or "long direction") in accordance with ASTM D882-18 (Standard Test Method for Tensile Properties of Thin Plastic Sheeting) and ASTM D638-14 (Standard Test Method for Tensile Properties of Plastics). In a specific example, the reed may comprise an elongation at break in the machine direction (also referred to herein as "elongation at break MD") of not less than 70%, not less than 100%, not less than 120%, not less than 150%, not less than 160%, or not less than 180%. In a specific example, the reed may comprise an elongation at break in the machine direction of not greater than 420%, not greater than 400%, not greater than 380%, not greater than 360%, not greater than 340%, not greater than 320%, not greater than 300%, or not greater than 285%. In a particular implementation the reed may comprise a elongation at break in the machine direction within a range comprising any pair of the previous upper and lower limits. In a specific example, the reed may comprise an elongation at break in the machine direction in a range of not less than 70% to not greater than 380%, such as not less than 100% to not greater than 360%, not less than 120% to not greater than 340%, not less than 150% to not greater than 320%, not less than 160% to not greater than 300%, or not less than 180% to not greater than 285%.

In various implementations of the embodiments described herein, reed material (e.g., reed material for reed 604) may have a particular elongation at break in the cross direction (also called in the art "crosswise" or "transverse direction") in accordance with ASTM D882-18 (Standard Test Method for Tensile Properties of Thin Plastic Sheeting) and ASTM D638-14 (Standard Test Method for Tensile Properties of Plastics). In a specific example, the reed may comprise an elongation at break in the cross direction (also referred to herein as "elongation at break TD") of not less than 100%, not less than 140%, not less than 190%, not less than 200%, not less than 220%, or not less than 245%. In a specific example, the reed may comprise an elongation at break in the cross direction of not greater than 600%, not greater than 580%, not greater than 560%, not greater than 540%, not greater than 520%, not greater than 500%, not greater than 480%, not greater than 460%, not greater than 440%, or not greater than 420%. In a particular implementation the reed may comprise an elongation at break in the cross direction within a range comprising any pair of the previous upper and lower limits. In a specific example, the reed may comprise an elongation at break in the cross direction in a range of not less than 100% to not greater than 600%, such as not less than 140% to not greater than 540%, not less than 190% to not greater than 460%, or not less than 220% to not greater than 420%.

In various implementations of the embodiments described herein, reed material (e.g., reed material for reed 604) may have a particular modulus of elasticity ("Young's modulus") in accordance with ASTM D882-18 (Standard Test Method for Tensile Properties of Thin Plastic Sheeting) and ASTM D638-14 (Standard Test Method for Tensile Properties of Plastics). In a specific example, the reed may comprise a modulus of elasticity of not less than 10 MPa, not less than 11 MPa, not less than 12 MPa, not less than 13 MPa, not less than 14 MPa, or not less than 15 MPa. In a specific example, the reed may comprise a modulus of elasticity (Young's modulus) of not greater than 34 MPa, not greater than 33 MPa, not greater than 32 MPa, not greater than 31 MPa, not greater than 30 MPa, or not greater than 29 MPa. In a particular implementation the reed may comprise a modulus of elasticity (Young's modulus) within a range comprising any pair of the previous upper and lower limits. In a specific example, the reed may comprise an modulus of elasticity (Young's modulus) of not less than 10 MPa to not greater than 34 MPa, such as not less than 12 MPa to not greater than 32 MPa, or not less than 14 MPa to not greater than 16 MPa.

In various implementations of the embodiments described herein, a tension of the reed (also referred to herein as reed tension) varies responsive to a force applied by a user to the reed to modulate the sound produced by the game call, such as modulating the pitch of the game call sound. In an implementation, the force may be applied to tension the reed by applying the force to deform the cavity, wherein the cavity is deformable. In a specific implementation, the cavity may be formed between the first member and the second member, wherein as the first member and second member are pressed toward each other a reed tensioner is put in contact with the reed, applying force to the reed, and altering the tension of the reed. In a specific example, the reed tensioner may be adapted to alter the tension of the reed as the first member and second member are pressed toward each other and the first contact point is in contact with the reed.

In various implementations of the embodiments described herein, the call may comprise a single reed tensioner or multiple reed tensioners. In an implementation, the reed tensioner may comprise an integral portion of the first member or of the second member or a combination thereof. In an implementation, the reed tensioner may comprise a separate piece that is coupled to the first member, the second member, or a combination thereof. In various implementations of the embodiments described herein, the reed tensioner may comprise a contact point disposed on a proximal edge of the first member or a contact point on a proximal edge of the second member, or both. In an implementation, the reed tensioner may comprise a contact point disposed on the proximal edge of the first member. In an implementation, the reed tensioner may comprise a contact point disposed on the proximal edge of the second member. In a specific example, the reed tensioner may comprise a portion of a flap of the first member, a flap of the second member, or a combination thereof. In another specific example, the reed tensioner may comprise a portion of the proximal edge of the first member and a portion of the proximal edge of the second member that are substantially opposite each other when brought into contact with the reed. In a specific implementation, the reed tensioner may comprise at least two contact points. In a specific implementation, the reed tensioner may comprise a first contact point and a second contact point. In a specific implementation, the first contact point and the second contact point may be disposed on the same member or on different members. In a specific example, the first contact point and the second contact point are disposed on the same member. In a specific example, the first contact point and the second contact point are disposed on different members.

In various implementations of the embodiments described herein, the distance the contact points are spaced apart may vary. In a specific implementation, a first contact point and a second contact point may be at least about 1.1 inches apart. In a specific implementation, a first contact point and a second contact point may be not greater than about 1.8 inches apart. In a specific example, a first contact point and a second contact point may be spaced apart at least about 1.1 inches and not greater than about 1.8 inches, such as at least about 1.2 inches and not greater than about 1.7 inches, or at least about 1.3 inches and not greater than about 1.6 inches.

In various implementations of the embodiments described herein, the tension of the reed may vary when the folded structure is open. In various implementations, the reed may be loose, pre-tensioned, or a combination thereof while the folded structure is open. As used herein, the term "loose" means that the reed is not in tension (i.e., not being stretched) while the folded structure is open. As used herein, the term "pre-tensioned" means that the reed is already in tension (i.e., is being stretched) while the folded structure is open. As used herein, the term "open" means that no force is being applied to the members of the folded structure and the contact point or contact points are not in contact with the reed.

In various implementations of the embodiments described herein, the reed may be coupled to the body of the game calling device. In an implementation, the reed may be coupled to the proximal end of the first member, the proximal end of the second member, or a combination thereof. In a specific implementation, the reed may be coupled to the proximal end of the first member. In a specific example, the reed may be coupled to the proximal end of the second member. In a specific example, the reed may be coupled to the proximal end of the first member and the second member.

In various implementations of the embodiments described herein, the reed may be coupled to the body of the game calling device with a fastener. In various implementations, the fastener may be permanent, temporary, removeable, adjustable, or a combination thereof. In a specific implementation, the fastener may comprise an adhesive, an adhesive tape, a rivet, a grommet, an eyelet, a pin, a staple, a nail, a screw, a nut and bolt, a tab, a clip, a button, a snap, or a combination thereof. In a specific example, the adhesive tape may comprise a gaffer's tape or a duct tape. In a specific example, the rivet may comprise a pop rivet. In a specific example, the fastener may comprise a rivet, a grommet, or an eyelet, or a combination thereof.

In various implementations of the embodiments described herein, the reed may be disposed in various locations or positions within the cavity of the game calling device. In an implementation, the reed may be external to a user's mouth (i.e., not located with the user's mouth) when the game calling device is in use. In an implementation, the reed may be oriented so that air flows perpendicular to a length of the reed when the game calling device is in use. In an implementation, the reed may be disposed within the first air passage opposite the hinge and extend transversally across the first air passage. In an example, the reed may be coupled to the proximal end of the first member and be disposed above and extend parallel to the proximal edge of the first member.

In various implementations of the embodiments described herein, the wild game calling device may have particular portability properties. In an implementation, the wild game calling device may comprise a hand-held calling device. In various implementations of the embodiments described herein, the wild game calling device may be adapted to mimic certain animal sounds, including combinations of animal sounds, to attract animals closer, including mating calls, challenge calls, and alarm calls. In a specific implementation, the wild game calling device may mimic calls of animals from the Cervidae family (the "Deer family"), including elk, deer, moose, caribou, muntjac, chital, brocket, and pudu. In a specific implementation, the wild game calling device may mimic calls of coyotes, cougar, bear, bobcat, and wolf. In various implementations of the embodiments described herein, the wild game calling device may produce particular sounds or particular sound frequencies. In a specific implementation, the wild game calling device may comprise a sound profile including an average loudness of about 97 db and a peak loudness of about 112 decibels.

In various implementations of the embodiments described herein, the wild game calling device may be used according to a method or process. In an implementation, a user of the calling device may use the game calling device by: placing the game calling device in the user's mouth with the top member of the game calling device resting against the user's upper lip and the bottom member of the game calling device resting against the user's lower lip; presenting air (i.e., blowing air) over the reed and through the air passage formed by the top member and the bottom member to vibrate the reed, while also making an airtight seal around the air passage so that air does not escape out the side of the user's mouth. In a specific implementation, the pitch and volume of the sounds produced by the game calling device may be manipulated by controlling the air volume blown over the reed, the air pressure (i.e., how forcefully the user blows) of the air over the reed, pressing against the upper member to affect the reed tension, pressing against the lower member to affect the reed tension, or a combination thereof. In an example, controlling the forward air pressure and the amount of pressing against the upper member and the lower member may create both high pitches and low pitches.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to be a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive meaning of "or" and not to an exclusive meaning of "or." For example, a condition A or B is satisfied by any one of the following: A is true (or present), and B is false (or not present), A is false (or not present), and B is true (or present), and both A and B are true (or present).

Also, the use of the terms "a" or "an" is employed to describe elements and components herein. This is done merely for convenience and to give a general sense of the scope of the embodiments. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the terms "generally equal," "generally same," "substantially," and the like, refer to deviations of no greater than 10% of a chosen value. For more than two values, the deviation can be measured with respect to a central value. For example, "generally equal" refers to two or more conditions that are no greater than 10% different in value. Demonstratively, angles offset from one another by 98% are generally perpendicular.

Unless otherwise defined, technical and scientific terms used herein have the same meaning as commonly understood by one of ordinary skill in the art to which these embodiments belong. The materials, methods, and examples are illustrative only and not intended to be limiting. To the extent not described herein, many details regarding specific materials and processing acts are conventional and may be found in textbooks and other sources within the wild game calling arts.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges include each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A wild game calling device, comprising:
a cavity; and
a reed disposed within the cavity, the reed comprising
a vinyl polymer having an impact strength of at least 40 g to not greater than 1140 g, a tensile strength in a machine direction of at least 550 PSI to not greater than 4400 PSI, and a modulus of elasticity of at least 15 MPa and not greater than 30 MPa,
wherein:
the reed comprises a thickness of at least 1 mil (0.001 in.) to not greater than 20 mil (0.02 in.);
the cavity is deformable while air is passed over the reed to make a game call sound; and
a tension of the reed varies responsive to a force applied by a user to the cavity to modulate a pitch in the game call sound.

2. The wild game calling device of claim 1, wherein the vinyl polymer comprises a polyethylene, a polypropylene, a polyvinyl chloride, a polyvinyl acetate, a polyacrylonitrile, mixtures thereof, or a combination thereof.

3. The wild game calling device of claim 2, wherein the polyethylene comprises a low density polyethylene (LDPE), a high density polyethylene (HDPE), mixtures thereof, or a combination thereof.

4. The wild game calling device of claim 3, wherein the polyethylene comprises a low density polyethylene (LDPE).

5. The wild game calling device of claim 1, wherein the reed comprises a thickness of at least 5 mil (0.005 in.) and not greater than 15 mil (0.015 in.).

6. The wild game calling device of claim 1, wherein the reed comprises a band, a belt, a loop, or a strip of material.

7. A wild game calling device, comprising:
a body including a cavity, and
a reed disposed within the cavity, the reed comprising
an impact strength of at least 40 g to not greater than 1140 g,
wherein:
the cavity is deformable while air is passed over the reed to make a game call sound;
a tension of the reed varies responsive to a force applied by a user to the cavity to modulate a pitch in the game call sound;
the reed is fixedly fastened to two locations on a structure forming the cavity;
the reed is fixedly fastened so as to substantially eliminate slippage of the reed relative to the two locations on the structure while a force is applied to and/or released from the structure to modulate the pitch;
the reed is fixedly fastened with a fastener comprising a rivet, a grommet, an eyelet, a pin, a staple, a tab, a clip, a button, a snap, or a combination thereof;
the cavity is formed between a first member and a second member;

a proximal edge of the first member and a proximal edge of the second member define a first air passage in communication with the cavity;

the reed is disposed across the first air passage;

as a force is applied by a user to deform the cavity, the first member and second member are pressed toward each other;

at least a first end of the reed is disposed between and fixedly coupled to the first member and the second member at a proximal end of the body; and the first member, the second member, and the first end of the reed comprise a lap joint at the proximal end of the game calling device.

8. The wild game calling device of claim 7, wherein:

a second end of the reed is disposed between and fixedly coupled to the first member and the second member at a proximal end of the body; and the first member, the second member, and the second end of the reed comprise a lap joint located at the proximal end of the wild game calling device.

9. The wild game calling device of claim 8, wherein the lap joint includes the fastener.

10. The wild game calling device of claim 9, wherein the fastener comprises a rivet, a grommet, an eyelet, or a combination thereof.

11. A wild game calling device, comprising:

a body including a cavity, and a reed disposed within the cavity, wherein:

the cavity is deformable while air is passed over the reed to make a game call sound;

a tension of the reed varies responsive to a force applied by a user to the cavity to modulate a pitch in the game call sound;

the reed is fixedly fastened to two locations on a structure forming the cavity;

the reed is fixedly fastened so as to substantially eliminate slippage of the reed relative to the two locations on the structure while a force is applied to and/or released from the structure to modulate the pitch;

the reed is fixedly fastened with a fastener comprising a rivet, a grommet, an eyelet, a pin, a staple, a tab, a clip, a button, a snap, or a combination thereof;

the cavity is formed between a first member and a second member;

a proximal edge of the first member and a proximal edge of the second member define a first air passage in communication with the cavity;

the reed is disposed across the first air passage;

as a force is applied by a user to deform the cavity, the first member and second member are pressed toward each other;

at least a first end of the reed is disposed between and fixedly coupled to the first member and the second member at a proximal end of the body; and the first member, the second member, and the first end of the reed comprise a lap joint at the proximal end of the wild game calling device.

\* \* \* \* \*